(12) United States Patent
Bott et al.

(10) Patent No.: US 7,755,315 B2
(45) Date of Patent: Jul. 13, 2010

(54) ROTARY LINEAR DRIVE HAVING A TRANSMITTER DEVICE

(75) Inventors: Erich Bott, Hollstadt (DE); Matthias Braun, Weichtungen (DE); Holger Schunk, Lendershausen (DE); Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 468 days.

(21) Appl. No.: 11/719,917

(22) PCT Filed: Nov. 17, 2005

(86) PCT No.: PCT/EP2005/056029
§ 371 (c)(1),
(2), (4) Date: Nov. 20, 2007

(87) PCT Pub. No.: WO2006/056551
PCT Pub. Date: Jun. 1, 2006

(65) Prior Publication Data
US 2009/0039713 A1    Feb. 12, 2009

(30) Foreign Application Priority Data
Nov. 22, 2004  (DE) .................. 10 2004 056 211

(51) Int. Cl.
*H02K 7/12*  (2006.01)
*H02K 9/20*  (2006.01)
*H02K 41/00*  (2006.01)
(52) U.S. Cl. ...................... 318/538; 318/652
(58) Field of Classification Search ............ 318/135, 318/538, 539, 540, 652, 687
See application file for complete search history.

(56) References Cited

U.S. PATENT DOCUMENTS

| 5,105,932 | A | * | 4/1992 | Bryson et al. | 198/619 |
| 5,931,142 | A | * | 8/1999 | Gerling | 123/568.23 |
| 5,949,211 | A |   | 9/1999 | McCann | |
| 6,097,272 | A | * | 8/2000 | Grover et al. | 335/207 |

(Continued)

FOREIGN PATENT DOCUMENTS

DE    29 06 404    8/1980

(Continued)

OTHER PUBLICATIONS

"Endanschläge in einem Rotationslinearantrieb"; Autor: Jürgen Carstens, Siemens AG; in IP.com Datenbank, vom Aug. 24, 2004.

*Primary Examiner*—Bentsu Ro
(74) *Attorney, Agent, or Firm*—Henry M. Feiereisen; Ursula B. Day

(57) ABSTRACT

The aim of the invention is to provide a linear/rotation drive with an improved transmitter device for detecting the linear and rotational movements. For this purpose, the transmitter device (12, 14, 16, 17) for detecting the linear movement and/or rotational movement of the secondary part (4) of the linear drive (2) configured as an external rotor is at least partially arranged inside the primary part (6) of the linear drive (2). In this manner, the transmitter device (12, 14, 16, 17) is located in a magnetically shielded area. In order to avoid eccentricities in the transmitted device (12, 14, 16, 17), a journal (10) of the secondary part (4) is mounted on a bearing (11) in the primary part (6).

6 Claims, 1 Drawing Sheet

U.S. PATENT DOCUMENTS

| | | | |
|---|---|---|---|
| 6,310,455 B1 * | 10/2001 | Siraky et al. | 318/560 |
| 6,336,687 B1 * | 1/2002 | Achmad | 303/113.1 |
| 6,433,447 B1 * | 8/2002 | Kitazawa et al. | 310/12.14 |
| 2002/0047367 A1 | 4/2002 | Kim et al. | |
| 2004/0155539 A1 | 6/2004 | Potoradi et al. | |

FOREIGN PATENT DOCUMENTS

| | | |
|---|---|---|
| DE | 36 10 479 A1 | 10/1987 |
| DE | 198 05 783 C2 | 6/2000 |
| DE | 696 16 319 T2 | 7/2002 |
| DE | 102 58 778 A1 | 7/2004 |
| DE | 103 59 713 A1 | 7/2004 |
| DE | 103 24 601 | 12/2004 |
| EP | 1 375 205 A2 | 1/2004 |

* cited by examiner

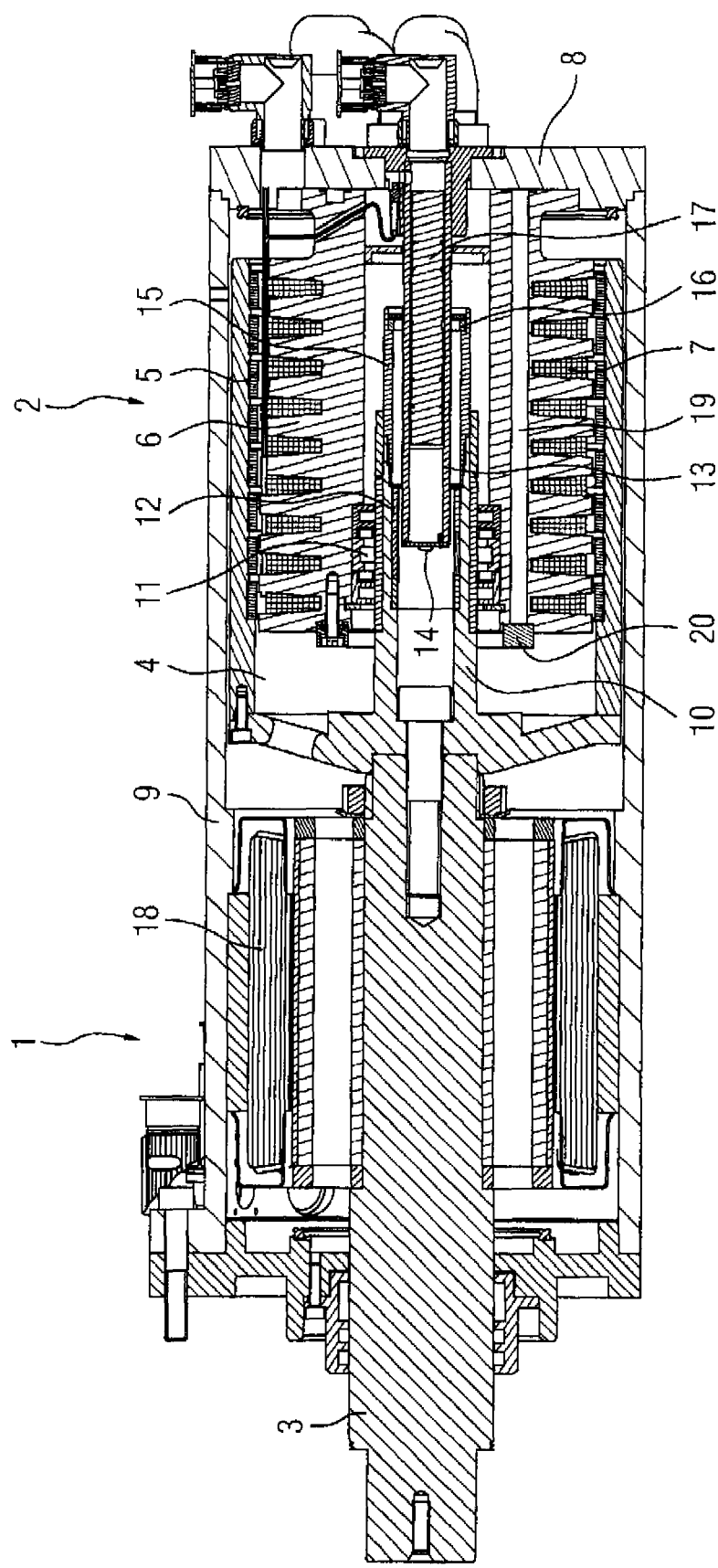

ROTARY LINEAR DRIVE HAVING A TRANSMITTER DEVICE

BACKGROUND OF THE INVENTION

The present invention relates to a rotary linear drive having a linear drive device that has a primary part and a secondary part.

Rotary linear drives are generally known. Compared to rotary linear drives having an internal rotor, rotary linear drives having an external rotor for the linear drive have the advantage that they have a greater air gap area for the same outside diameter, and so higher axial forces can be produced.

Both the linear movement and the rotary movement of such rotary linear drives must be detected by appropriate transmitters so as to be controlled. However, magnetic detection devices suitable for this purpose are generally very sensitive to eccentricities between the transmitter magnets and the sensor.

Moreover, the placing of the magnetic field sensors of the transmitter devices is critical. They must in principle be shielded from the electromagnets and/or permanent magnets of the linear drive or be appropriately far removed from them.

SUMMARY OF THE INVENTION

It is therefore the object of the present invention to propose a rotary linear drive having an improved transmitter device.

This object is achieved according to the invention by means of a rotary linear drive having a linear drive device that has a primary part and a secondary part, the secondary part being configured as an external rotor, and a transmitter device for detecting a linear movement and/or a rotary movement being arranged at least partially in the interior of the primary part.

By arranging the transmitter device at least partially in the interior of the primary part, it is possible to shield the latter as far as possible from the magnetic devices of the primary part. This ensures a higher quality of the transmitter signals.

In accordance with an inventive development, at least one component of the transmitter device is mounted on a hollow journal of the secondary part, and in which the hollow journal projects into the interior of the primary part. The movement of the secondary part in the interior of the primary part can thereby be recorded.

In order to detect the movement of the hollow journal, a stationary sensor pin can project into the interior of the hollow journal. It is thereby possible to record movements of transmitter magnets that are fastened on the hollow journal.

The hollow journal is preferably supported in a bore of the primary part. Eccentricities can be avoided for the most part owing to the fact that the transmitter device is arranged on the hollow journal and thus in the vicinity of the bearing.

A linear transmitter magnet whose linear movement is detected by a sensor in the sensor pin can be fitted on the free end of the hollow journal. Specifically, the magnet can be a ring magnet that is moved via a cylindrical linear sensor having one secondary coil and two primary coils.

Furthermore, there can be arranged on the circumference of the hollow journal at least one rotary transmitter magnet whose rotary movement can be detected by a sensor at the free end face of the sensor pin. The sensor working in the interior of the hollow journal is thereby largely shielded from external influences.

In one particularly preferred embodiment, the primary part has a cooling device. This is intended, in particular, also to cool the inner region of the primary part such that the transmitter device, but also the bearing of the hollow journal, is not excessively heated by the power loss of the primary part.

BRIEF DESCRIPTION OF THE DRAWING

The present invention will now be explained in more detail with the aid of the attached drawing, in which the sole FIGURE shows a cross section through a rotary linear drive according to the invention.

DETAILED DESCRIPTION OF PREFERRED EMBODIMENTS

The exemplary embodiment outlined in more detail below constitutes a preferred embodiment of the present invention.

The rotary linear drive illustrated in the FIGURE has a rotary drive unit 1 and a linear drive unit 2. It is thereby possible to move a shaft 3 both in a circumferential direction and in an axial direction. Such movements are required, for example, for rolls of printing machines or for machine tools and, in particular, milling machines.

The linear drive 3 is equipped with an external rotor 4 that is of pot-shaped configuration. The external rotor is fitted with permanent magnets 5 on its inner circumference.

A hollow cylindrical primary part is located in the interior of the secondary part 4 or of the external rotor. The primary part 6 is provided with windings 7. Furthermore, the primary part 6 is permanently connected in a rotationally fixed fashion to a cover 8 of the housing 9 of the rotary linear drive.

At the center, the primary part 6 has a bore into which a hollow journal 10 of the secondary part 4 projects. The hollow journal 10 is supported in the bore of the primary part 6 with the aid of a bearing 11.

The hollow journal 10 has a bore on whose inside rotary transmitter magnets 12 are fitted. The axial extent of the rotary transmitter magnets 12 corresponds approximately to the stroke that the linear drive 2 can execute. This ensures that a rotary signal can be obtained in the entire linear range of the drive.

Also fitted in a rotationally fixed fashion on the cover 8 is a tube or a sensor pin 13. Located on the end face of the tubular sensor pin 13 is a rotation sensor 14 that is implemented by an angle Hall sensor, for example. The latter senses rotary movements of the rotary transmitter magnet 12 on the hollow journal 10 of the secondary part 4.

A plastic extension tube 15 is fastened in the free end of the hollow journal 10. An annular linear transmitter magnet 16 is located on the end of this extension tube 15. The extension tube 15 made from plastic does not influence the magnetic field of the transmitter magnets 12 and 16.

In order to detect the linear movement of the hollow journal 10 or the secondary part 4, a linear sensor 17 is, furthermore, accommodated in the sensor pin 13. Said linear sensor consists of a soft magnetic material including one secondary coil and two primary coils. It is capable of detecting the linear position of the linear transmitter magnet 16, and thus of detecting the linear position of the secondary part 4.

The specific fashioning of the linear rotor or secondary part 4, designed in the form of an external rotor, with a hollow journal 10 in the interior thereof therefore renders it possible to arrange on the hollow journal 10 the transmitter magnets 12 and 16 that also execute the rotary and linear movement of the rotor.

The extension tube 15 made from plastic does not influence the magnetic field of the transmitter magnets 12 and 16.

The sensor pin 13 is exchangeably fastened on the cover 8, and is therefore fixed in position and alignment by comparison with the housing 9, the windings 7 of the primary part 6 and the windings 18 of the rotary drive 1.

Since the hollow journal 10 is also used for the arrangement of the bearing 11, this results in the advantage of a virtually ideal, coaxial arrangement of the transmitter magnets 12 and 16 relative to the sensors 14 and 17. It is thereby possible to attain a high quality of the transmitter signals.

A further advantage of this arrangement of the transmitter device inside the primary part 6 of the linear drive 2 consists in the shielded position of the transmitter magnets and sensors of the electromagnetic fields of the drives 1 and 2. The alternating fields of the drives 1 and 2 therefore exert no influence on the sensor signals of the transmitter device.

The primary part 6 of the linear drive 2 is provided with water cooling that is indicated by a cooling bore 19. A number of these axially running cooling bores 19 are interconnected by meandering built-in tracks in the cover 8 and a further cover 20 fitted on the opposite end face of the primary part 6. Alternatively or in addition, the cooling can be implemented by a helical groove that is built into the bore of the primary part 6. This helical groove can be covered by a sleeve that can then serve at the same time as external sleeve of the bearing 11.

The cooling means that the region of the transmitter device 12, 14, 16, 17 and of the bearing 11 near the region of the windings 7 are cooled effectively at the same time. It is thereby possible to avoid thermal drifting of the sensor signals or else a sensor failure because of an excessively high temperature.

The axial extent of the rotary transmitter magnets 12 corresponds approximately to the stroke that the linear drive 2 can execute. It is thereby ensured that a rotary signal can be obtained in the entire linear range of the drive.

Simple mounting and dismounting is ensured by the arrangement of the two transmitter systems (linear and rotary transmitter systems). Exertion of mutual influence is, furthermore, as good as excluded.

What is claimed is:

1. A rotary linear drive, comprising:
   a linear drive device having a primary part and a secondary part, said secondary part being configured as an external rotor, wherein the secondary part has a hollow journal projecting into an interior of the primary part; and
   a transmitter device for detecting a linear movement and/or a rotary movement of the secondary part, said transmitter device having at least one component which is mounted on the hollow journal of the secondary part so that the transmitter device is arranged at least partially in the interior of the primary part.

2. The rotary linear drive of claim 1, further comprising a stationary sensor pin projecting into the interior of the hollow journal.

3. The rotary linear drive of claim 2, wherein the transmitter device includes a linear transmitter magnet fitted on a free end of the hollow journal, and a sensor for detecting a linear movement of the linear transmitter magnet in the sensor pin.

4. The rotary linear drive of claim 2, wherein the transmitter device includes at least one rotary transmitter magnet arranged on a circumference of the hollow journal, and a sensor for detecting a rotary movement of the rotary transmitter magnet at a free end of the sensor pin.

5. The rotary linear drive of claim 1, wherein the hollow journal is supported in a bore of the primary part.

6. The rotary linear drive of claim 1, wherein the primary part has a cooling device.

* * * * *